United States Patent [19]

Harms et al.

[11] Patent Number: 4,588,810
[45] Date of Patent: May 13, 1986

[54] BASIC TRIPHENDIOXAZINE DYESTUFFS

[75] Inventors: Wolfgang Harms, Leverkusen; Günter Franke, Leichlingen; Klaus Wunderlich, Leverkusen, all of Fed. Rep. of Germany

[73] Assignee: Bayer Aktiengesellschaft, Leverkusen, Fed. Rep. of Germany

[21] Appl. No.: 677,782

[22] Filed: Dec. 4, 1984

[30] Foreign Application Priority Data

Dec. 8, 1983 [DE] Fed. Rep. of Germany ....... 3344472

[51] Int. Cl.$^4$ ...................... C09B 19/00; C09B 19/02
[52] U.S. Cl. ......................................... 544/76; 544/75
[58] Field of Search ................................... 544/75, 76

[56] References Cited

U.S. PATENT DOCUMENTS

| 3,996,221 | 12/1976 | Leng et al. | 544/75 X |
| 4,092,478 | 5/1978 | Plant et al. | 544/76 |
| 4,336,377 | 6/1982 | Adam et al. | 544/74 |
| 4,440,504 | 8/1983 | Harms et al. | 544/76 |
| 4,472,575 | 9/1984 | Renfrew | 544/76 |
| 4,512,773 | 4/1985 | Anderton et al. | 544/74 |

FOREIGN PATENT DOCUMENTS 101665  2/1984  European Pat. Off. .

Primary Examiner—Richard L. Raymond
Attorney, Agent, or Firm—Sprung Horn Kramer & Woods

[57] ABSTRACT

Basic triphendioxazine dyestuffs of the formula

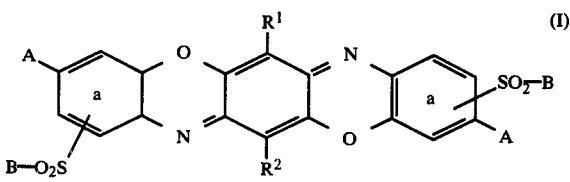

wherein
$R_1$ and $R_2$, independently of each other, each denote hydrogen, halogen, alkyl, cyclohexyl, aryl, alkoxy, aryloxy, CN, $CONH_2$, CONH-alkyl, $CON(alkyl)_2$, CONH-aryl, COOalkyl, NH—CO-alkyl, NH—CO-aryl or NH-aryl and
A and B, independently of each other, each denote an amine radical or a radical of a polyamine which can be protonated or quaternized, with the proviso that at least one of the radicals A or B stands for such a polyamine radical, and said substituents and the rings a can be substituted by the non-ionic, cationic or anionic radicals customary in dyestuff chemistry, with the proviso that the total number of anionic groups is less than the total number of protonatable and quaternizable nitrogen atoms in A and B, are used for dyeing cationically dyeable substrates, in particular paper and polyacrylonitrile.

5 Claims, No Drawings

BASIC TRIPHENDIOXAZINE DYESTUFFS

The invention relates to basic triphendioxazine dyestuffs of the formula

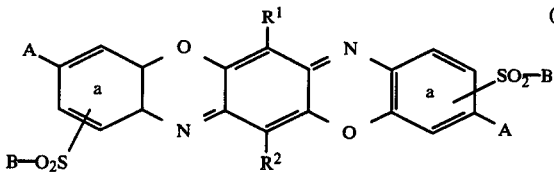

wherein

R₁ and R₂, independently of each other, each denote hydrogen, halogen, alkyl, cyclohexyl, aryl, alkoxy, aryloxy, CN, CONH₂, CONH-alkyl, CON(alkyl)₂, CONH-aryl, COOalkyl, NH—CO-alkyl, NH—CO-aryl or NH—aryl and A and B, independently of each other, each denote an amine radical or a radical of a polyamine which can be protonated or quaternised, with the proviso that at least one of the radicals A or B stands for such a polyamine radical, and said substituents and the rings a can be substituted by the non-ionic, cationic or anionic radicals customary in dyestuff chemistry, with the proviso that the total number of anionic groups is less than the total number of protonatable and quaternisable nitrogen atoms in A and B, to their preparation, to their aqueous solutions and to their use for dyeing cationically dyeable substrates, in particular paper and polyacrylonitrile.

Amine radicals A or B are preferably to be understood to be those of the formula

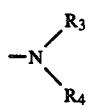

wherein

R₃ and R₄ each denote hydrogen, alkyl, cycloalkyl or aralkyl and optionally protonated or quaternised polyamine radicals A or B are to be understood as meaning those of the formulae

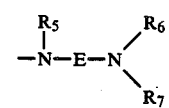

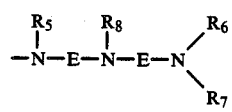

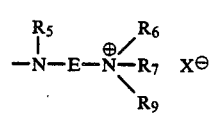

or

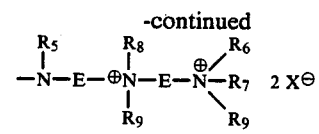

wherein

R₅–R₈ each denote hydrogen, alkyl or aralkyl and R₉ denotes hydrogen, alkyl or aralkyl or R₃ and R₄, R₅ and R₆, R₅ or R₆ and R₈, R₆ and R₇ or R₆, R₇ and R₉ are linked to form a ring, E stands for optionally branched C₂–C₆-alkylene, cyclohexylene, phenylene or a radical of the formulae

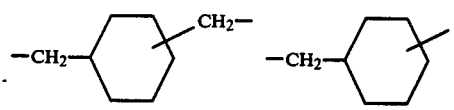

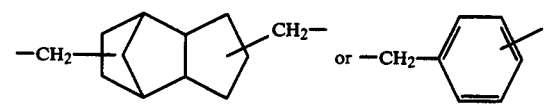

X⊖ stands for an anion, and wherein said cyclic and acyclic radicals can in turn be substituted by non-ionic or cationic radicals customary in dyestuff chemistry.

In the formula (I), R₁ and R₂ each preferably stands for halogen and in particular chlorine.

In the formulae (I)–(VI) an alkyl radical is to be understood as meaning in particular a radical having 1–6 carbon atoms.

Aryl and aralkyl preferably respectively stand for phenyl and benzyl or phenylethyl.

Examples of possible non-ionic substituents are halogen, such as fluorine, chlorine or bromine, hydroxyl, C₁–C₄-alkoxy, cyano, C₁–C₄-alkyl and amino.

A possible cationic substituent is in particular the ammonium group, and a possible anionic radical is the sulphato group.

However, non-ionic and cationic radicals are preferred.

The radicals

R₅ and R₆ together with —N—E—N—

R₅ and R₈ together with —N—E—N— or

R₆ and R₈ together with —N—E—N— can form a 5- or 6-membered ring, for example a piperazine or imidazolidine ring.

The radicals R₃ and R₄, together with N, can form a 5- or 6-membered ring, for example a piperidine, morpholine, piperazine or pyrrolidine ring.

The radicals R₆ and R₇ on the one hand and the radicals R₆, R₇ and R₉ on the other, together with N, can form a 5- or 6-membered ring, for example a piperidine, morpholine, piperazine or pyrrolidine and a pyridine ring respectively.

Said heterocyclic structures can carry further substituents, such as C₁–C₄-alkyl radicals, or a fused-on ring, for example a benzene ring.

Examples of anions X⁽⁻⁾ are chloride, bromide, iodide, sulphate, hydrogensulphate, methylsulphate, ethylsulphate, amidosulphate, perchlorate, phosphate, hydroxide, formate, acetate, propionate, oxalate, malonate, succinate, maleate, chloroacetate, trichloroacetate, methoxyacetate, ethoxyacetate, lactate, citrate, benzoate, methanesulphonate, ethanesulphonate, benzenesulphonate, p-toluenesulphonate and carbonate.

Examples of $R_1$ and $R_2$ are hydrogen, chlorine, bromine, $C_1$-$C_4$-alkyl, phenyl, chlorophenyl, methylphenyl, $C_1$-$C_4$-alkoxy, acetylamino, propionylamino, butyrylamino, benzoylamino, methylbenzoylamino, chlorobenzoylamino, phenoxy, chlorophenoxy, methylphenoxy, anilinocarbonyl, toluidinocarbonyl, chloroanilinocarbonyl, methoxycarbonyl and ethoxycarbonyl.

Examples of amine radicals A or B of the formula (II) in addition to $NH_2$, are methylamino, dimethylamino, ethylamino, diethylamino, propylamino, dipropylamino, butylamino, dibutylamino, 2-hydroxyethylamino, bis-(2-hydroxyethyl)-amino, 2-sulphatoethylamino, N-(2-hydroxyethyl)-N-methylamino, methylethylamino, benzylamino, 2-phenylethylamino, morpholino, piperidino, pyrrolidino, 2-sulphatoethylamino, N-methyl-N-(2-sulphatoethyl)-amino, 2-methoxyethylamino and 2-ethoxyethylamino.

Examples of polyamine radicals A or B of the formulae (III)–(VI) are 2-dimethylamino-1-ethylamino, 2-diethylamino-1-ethylamino, 2-(β-hydroxyethylamino)-1-ethylamino, 2-bis-(3-hydroxyethyl)-amino-1-ethylamino, N-(2-dimethylamino-1-ethyl)-N-methylamino, 2-methylamino-1-ethylamino, N-(2-ethylamino-1-ethyl)-N-ethylamino, 3-dimethylamino-1-propylamino, 3-diethylamino-1-propylamino, 3-methylamino-1-propylamino, 3-ethylamino-1-propylamino, 3-β-hydroxyethylamino)-1-propylamino, 3-bis-(β-hydroxyethyl)-amino-1-propylamino, 3-(N-methyl-N-β-hydroxyethyl)-amino-1-propylamino, 5-dimethylamino-2-pentylamino, 5-diethylamino-2-pentylamino, 2-amino-1-ethylamino, 3-amino-1-propylamino, 4-amino-1-butylamino, 5-amino-1-pentylamino, 6-amino-1-hexylamino, 3-amino-2-hydroxy-1-propylamino, 2-(N-morpholino)-1-ethylamino, 2-(N-piperazinyl)-1-ethyl-amino or N-(N'-2-aminoethyl)-piperazino, 2-[N-(N'-methyl)-piperazinyl]-1-ethylamino, 2-(N-piperidinyl)-1-ethylamino, 3-(N-piperazinyl)-1-propylamino, or N-(N'-3-aminopropyl)-piperazino, 3-[N-(N'-methyl)-piperazinyl]-1-propylamino, 3-(N-morpholino)-1-propylamino, piperazinyl, N-methyl-N'-piperazinyl, N-ethyl-N'-piperazinyl, 3-(N-piperidinyl)-1-ethylamino, 3-(N-pyrrolidinyl)-1-propylamino, 2-(N-pyrrolidinyl)-1-ethylamino, N-β-hydroxyethyl)-N'-piperazinyl, 4-amino-1-cyclohexylamino, 3-amino-1-cyclohexylamino, 4-, 3-, 2-dimethylaminophenylamino, 4-(β-diethylaminoethyl)-phenylamino, 4-N-(3'-dimethylamino-1'-propylamino)-phenylamino, 4-N-(2'-dimethylamino-1'-ethylamino)-phenylamino, 3-(N-methyl-N-ε-aminopropyl)-1-propylamino, and also the radicals of diethylenetriamine, triethylenetetramine, tetraethylenepentamine, pentaethylenehexamine, dipropylenetriamine, tripropylenetetramine and the radicals

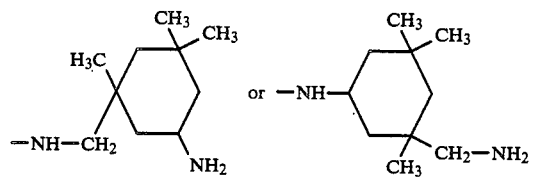

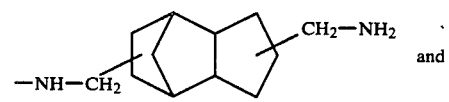

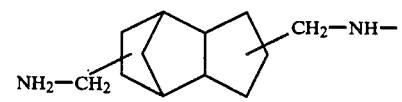

as well as the ammonium salts of these amines which carry as the fourth radical on the nitrogen for example a $C_1$-$C_4$-alkyl group, hydroxyethyl, hydroxypropyl, dihydroxypropyl, methoxycarbonylethyl, methoxycarbonylmethyl or benzyl.

Preferred dyestuffs of the formula (I) have the formula

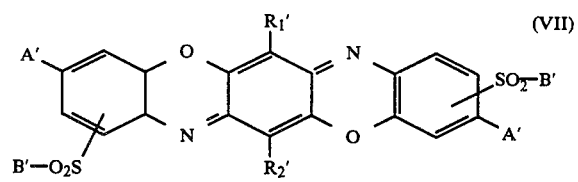

wherein $R_1'$ and $R_2'$ each denote hydrogen or halogen,

A' and B' each denote a radical of the formulae

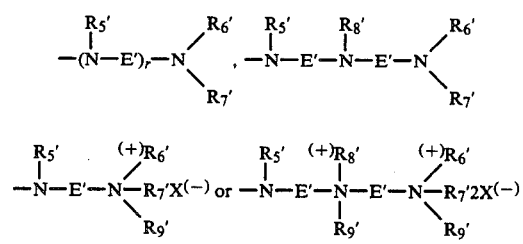

r denotes 0 or 1, $R_5'$-$R_9'$ each denote hydrogen or $C_1$-$C_4$-alkyl which is optionally substituted by hydroxyl, $C_1$-$C_4$-alkoxy, halogen, cyano, $C_1$-$C_4$-alkoxycarbonyl or $C_1$-$C_4$-alkylcarbonyl, $R_9'$ also denotes optionally $C_1$-$C_4$-alkyl-, hydroxyl-, $C_1$-$C_4$-alkoxy- or halogen-substituted benzyl or phenylethyl and E' denotes $C_2$-$C_6$-alkylene, cyclohexylene, phenylene or a radical of the formulae

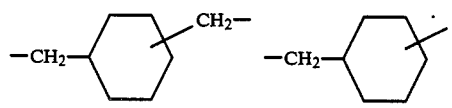

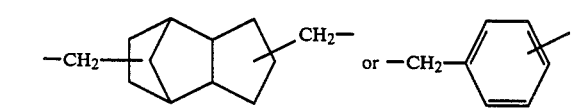

where the six-membered rings can be substituted by $C_1$-$C_4$-alkyl, or

Particularly preferred dyestuffs of the formula (I) have the formula

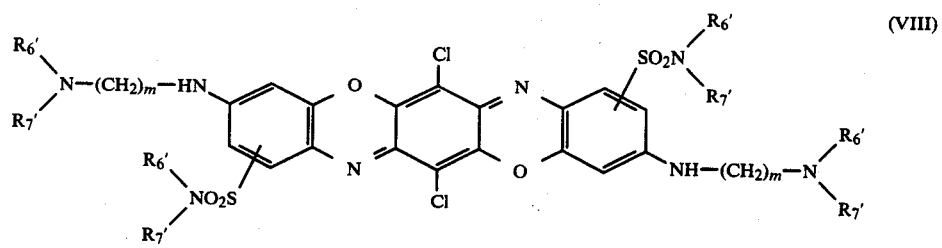
(VIII)

and the protonated and quaternised form thereof

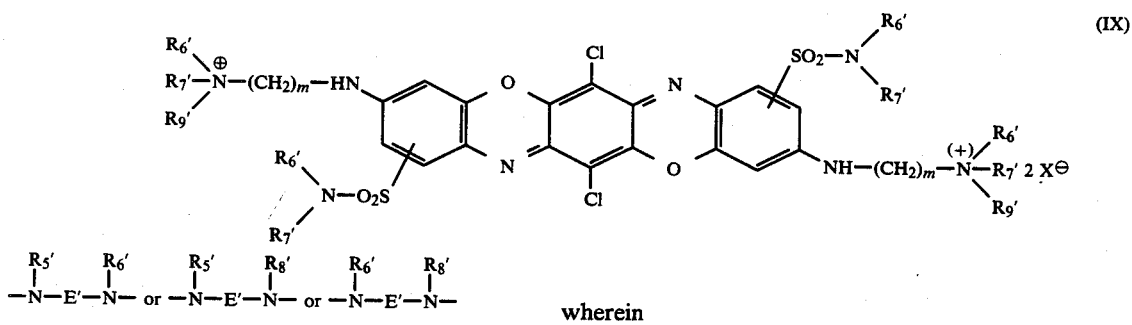
(IX)

wherein
$R_6'$, $R_7'$, $R_9'$, m and $X^\ominus$ are as defined above and m denotes 2–4.

Likewise preferred dyestuffs of the formula (I) have the formula

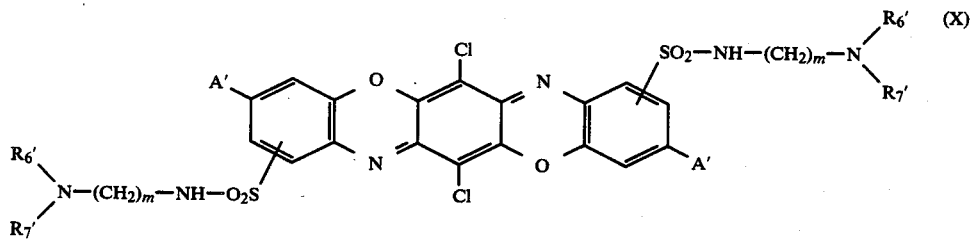
(X)

and the protonated or quaternised form thereof

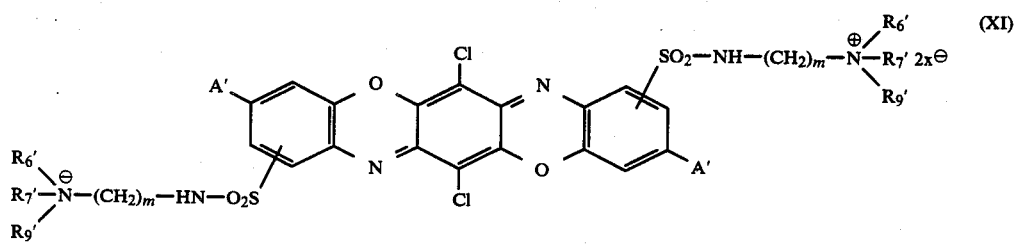
(XI)

wherein
$R_6'$, $R_7'$, $R_9'$, m and $X^\ominus$ are as defined above and
A' is amino, $C_1$–$C_4$-alkylamino or cyclohexylamino.

Of the dyestuffs of the formulae (VIII)–(XI) a particular mention should in turn go to those where
$R_6'$ and $R_7'$ = $C_1$–$C_4$-alkyl,
$R_9'$ = hydrogen, $C_1$–$C_4$-alkyl or benzyl or —N(R_5')—E'—N(R_6')— or —N(R_5')—E'—N(R_8')— or —N(R_6')—E'—N(R_8')— each represent an optionally $C_1$–$C_4$-alkyl-substituted piperazine or imidazolidine ring, or $R_7'$—N—$R_9'$ represents an optionally $C_1$–$C_4$-alkyl-substituted piperidine, morpholine, piperazine or pyrrolidine ring or

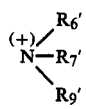

represents an optionally $C_1$–$C_4$-alkyl-substituted pyridinium radical and
$X^{(-)}$ represents an anion, and at least one of the radicals A' and B' stands for one of said optionally protonated or quaternised polyamine radicals.

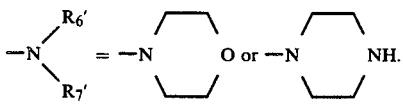

Compounds of the formula (I) are prepared by condensing 1,4-benzoquinones of the formula

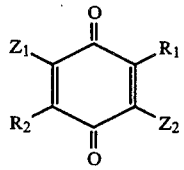
(XII)

wherein
R₁ and R₂ are as defined above and
Z₁ and Z₂ each denote hydrogen, Cl, Br, O-alkyl or O-aryl,
with 5-aminobenzenesulphonamides of the formula

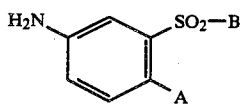
(XIII)

wherein
A and B are as defined above, to give compounds of the formula

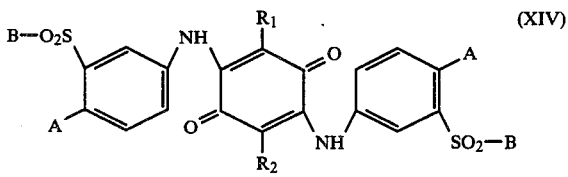
(XIV)

and subsequently cyclising said compounds (XIV) to compounds of the formula (I) and if desired converting them into the quaternary ammonium salts by dissolving them in dilute acids or treating them with quaternising agents.

The benzoquinones of the formula (XII) are best condensed with the aminobenzenesulphonamides of the formula (XIII) at pH 3–11, preferably pH 4–8, and temperatures of 20°–90° C., preferably 40°–70°, in aqueous or aqueous organic media in the presence of alkaline condensing agents or in buffered solutions containing the above alkaline condensing agents. The reaction can also be carried out in a pure organic medium in the presence of acid-binding agents.

Examples of alkaline condensing agents are sodium hydrogencarbonate, sodium carbonate, sodium acetate, potassium acetate, sodium hydroxide solution, potassium hydroxide solution, sodium phosphates and sodium borate.

The condensation products of the formula (XIV) are generally sparingly soluble and brown.

The starting 2-alkylamino- or 2-polyamino-5-aminobenzenesulphonamides of the formula (XIII) can be obtained by condensing 2-chloro-5-nitrobenzenesulphonyl chloride in stages with ammonia, alkylamines or polyamines and subsequently catalytically reducing the nitro group.

A variant for preparing compounds of the formula (XIV) comprises adding aminobenzenesulphonamides of the formula (XIII) onto 1,4-benzoquinones of the formula

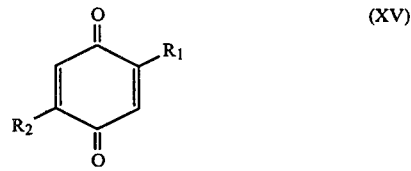
(XV)

wherein
R₁ and R₂ are as defined above, and oxidising the primarily resulting adducts.

The cyclisation of the condensation products of the formula (XIV) to the triphendioxazines (I) can be carried out in high-boiling organic solvents such as nitrobenzene, trichlorobenzene, dichlorobenzene, chloronaphthalene or quinoline in the presence or absence of condensing or oxidising agents such as acid halides, iron(III) chloride, dinitrophenols and organic peroxides. The cyclisation reaction proceeds particularly favourably at temperatures of 20°–70° C. in the presence or absence of oxidising agents such as manganese dioxide, potassium peroxodisulphate or nitrobenzenesulphonic acid in chlorosulphonic acid, sulphuric acid and especially oleum.

If the resulting dyestuff bases of the formula (I) are to be quaternised, this can be carried out in a conventional manner at temperatures of 0°–100° with conventional quaternising agents in inert aprotic solvents or in aqueous or aqueous organic media. If the quaternisation is carried out in aqueous media the pH needs to be controlled. The quaternisation is carried out at pH 6–12, preferably pH 7–11.

Examples of suitable customary quaternising agents are dimethyl sulphate, diethyl sulphate, methyl chloride, ethyl chloride, propyl chloride, butyl chloride, methyl bromide, methyl iodide, ethyl bromide, ethyl iodide, propyl bromide, butyl bromide, benzyl chloride, methyl bromoacetate, methyl chloropropionate, ethyl chloropropionate, methyl bromopropionate, ethyl bromopropionate, ethylene oxide, propylene oxide, epichlorohydrin, methyl benzenesulphonate, methyl p-toluenesulphonate and ethyl p-toluenesulphonate.

Examples of suitable benzoquinones of the formula (XII) are 2,3,5,6-tetrachloro-1,4-benzoquinone, 2,3,5,6-tetrabromo-1,4-benzoquinone, 2,5-dichloro-3,6-dimethyl-1,4-benzoquinone, 2,5-dichloro-3,6-dimethyl-1,4-benzoquinone, 2-methyl-3,5,6-trichloro-1,4-benzoquinone, 2-methyl-3,5,6-tribromo-1,4-benzoquinone, 2,5-dichloro-1,4-benzoquinone-3,6-dicarboxamide, 2,5-dibromo-1,4-benzoquinone-3,6-dicarboxamide, N-phenyl-2,5-dichloro-1,4-benzoquinone-3,6-dicarboxamide, N-4-methoxyphenyl-2,5-dibromo-1,4-benzoquinone-3,6-dicarboxamide, N-4-chlorophenyl-2,5-dichloro-1,4-benzoquinone-3,6-dicarboxamide, N-methyl-2,5-dibromo-1,4-benzoquinone-3,6-dicarboxamide, N,N-dimethyl-2,5-dichloro-1,4-benzoquinone-3,6-dicarboxamide, N-ethyl-2,5-dichloro-1,4-benzoquinone-3,6-dicarboxamide, 2,5-diacetylamino-3,6-dichlorobenzoquinone, 2,5-dibenzoylamino-3,6-dichlorobenzoquinone, 2,5-dimethyl-3-chloro-1,4-benzoquinone, 2-(4'-chlorophenyl)-3,5,6-trichloro-1,4-benzoquinone, 2,3,5,6-tetraphenoxy-1,4-benzoquinone, 2,3,5,6-tetra-(4'-methylphenoxy)-1,4-benzoquinone, 2,3,5,6-tetra-(4'-methoxyphenyl)-1,4-benzoquinone and 2,3,5,6-tetra-(4'-chlorophenoxy)-1,4-benzoquinone.

Examples of suitable quinones of the formula (XV) are 1,4-benzoquinone, 2,5-dimethyl-1,4-benzoquinone, 2-methyl-1,4-benzoquinone, 2-chloro-5-methyl-1,4-benzoquinone, 2-ethyl-1,4-benzoquinone, 2-n-propyl-1,4-benzoquinone, 2-cyclohexyl-1,4-benzoquinone, 2-phenyl-1,4-benzoquinone and 2-(4'-methylphenyl)-1,4-benzoquinone.

Examples of aminobenzenesulphonamides of the formula (XIII) which are suitable for the condensation with the 1,4-benzoquinones are N-(3-dimethylamino-1-propyl)-5-amino-2-methylaminobenzenesulphonamide, N-(3-dimethylamino-1-propyl)-5-amino-2-ethylaminobenzenesulphonamide, N-(3-dimethylamino-1-propyl)-5-amino-2-n-propylaminobenzenesulphonamide, N-(3-dimethylamino-1-n-butyl)-5-amino-2-isopropylaminobenzenesulphonamide, N-(3-dimethylamino-1-propyl)-5-amino-2-cyclohexylaminobenzenesulphonamide, N-(3-dimethylamino-1-propyl)-5-amino-2-dimethylaminobenzenesulphonamide, N-(3-dimethylamino-1-propyl)-5-amino-2-morpholinobenzenesulphonamide, N-(2-diethylaminoethyl)-5-amino-2-methylaminobenzenesulphonamide, N-(2-dimethylaminoethyl)-5-amino-2-methylaminobenzenesulphonamide, N-(3-diethylamino-1-propyl)-5-amino-2-ethylaminobenzenesulphonamide, N-(2-diethylaminoethyl)-5-amino-2-ethylaminobenzenesulphonamide, N-(3-N'-morpholino-1-propyl)-5-amino-2-methylaminobenzenesulphonamide, N-(3-N'-piperidyl-1-propyl)-5-amino-2-n-propylaminobenzenesulphonamide, N-(3-N''-methyl-N'-piperazino-1-propyl)-5-amino-2-methylaminobenzenesulphonamide, N-[3-bis-(β-hydroxyethylamino)-1-propyl]-5-amino-2-ethylaminobenzenesulphonamide, N-(3-propylamino-1-propyl)-5-amino-2-ethylaminobenzenesulphonamide, N-(3-methylethylamino-1-propyl)-5-amino-2-sec.-butylaminobenzenesulphonamide, N-(N'-methylpiperazinyl)-5-amino-2-methylaminobenzenesulphonamide, N-(3-methylamino-1-propyl)-5-amino-2-ethylaminobenzenesulphonamide, N-[3-(N'-methyl-N'-β-hydroxyethyl)-amino-1-propyl]-5-amino-2-methylaminobenzenesulphonamide, N-(4-amino-1-butyl)-5-amino-2-isobutylaminobenzenesulphonamide, N-(3-dimethylamino-1-propyl)-2,5-diaminobenzenesulphonamide, N-(2-diethylaminoethyl)-2,5-diaminobenzenesulphonamide, N-(3-dibutylamino-1-propyl)-2-amino-5-(2-methoxyethylamino)-benzenesulphonamide, N,N-dimethyl-5-amino-2-(3-dimethylamino-1-propylamino)-benzenesulphonamide, N,N-diethyl-5-amino-2-(3-dimethylamino-1-propylamino)-benzenesulphonamide, 5-amino-2-(3-dimethylamino-1-propylamino)-benzenesulphonamide, N-phenyl-5-amino-2-(2-dimethylamino-1-ethylamino)-benzenesulphonamide, N,N-dimethyl-5-amino-2-(3-N-morpholino-1-propylamino)-benzenesulphonamide, N-methyl-5-amino-2-(3-dimethylamino-1-propylamino)-benzenesulphonamide, N-(N'-methylpiperazinyl)-5-amino-2-(3-diethylamino-1-propylamino)-benzenesulphonamide, N-(3-dimethylamino-1-propyl)-5-amino-2-(3-dimethylamino-1-propylamino)-benzenesulphonamide, N-morpholinyl-5-amino-2-(3-methylethylamino-1-propylamino)-benzenesulphonamide, N-β-hydroxyethyl-5-amino-2-(3-N-methyl-N-benzylamino-1-propylamino)-benzenesulphonamide, N,N-bis-(β-hydroxyethyl)-5-amino-2-(3-dimethylamino-1-propylamino)-benzenesulphonamide, N-β-methoxyethyl-5-amino-2-(4-dimethylamino-1-butylamino)-benzenesulphonamide, N-(3-methylpropylamino-1-propyl)-5-amino-2-cyanoethylaminobenzenesulphonamide, N-(3-dimethylamino-1-butyl)-5-amino-2-carboxyethylaminobenzenesulphonamide, N-(2-dimethylaminoethyl)-5-amino-2-sulphoethylaminobenzenesulphonamide, N-(4-diethylamino-2-butyl)-5-amino-2-ethylaminobenzenesulphonamide, N-methyl-N-(2-dimethylaminoethyl)-5-amino-2-methylaminobenzenesulphonamide, N-ethyl-N-(2-diethylaminoethyl)-5-amino-2-ethyl-aminobenzenesulphonamide, N-(3-N'-methyl-N'-hydroxyethyl-1-propyl)-5-amino-2-methylaminobenzenesulphonamide, N-(3-N'-morpholino-1-propyl)-5-amino-2-ethylaminobenzenesulphonamide, N-(3-N'-morpholino-1-propyl)-2,5-diaminobenzenesulphonamide, N-(3-N'-morpholino-1-propyl)-5-amino-2-N-morpholinobenzenesulphonamide, 5-amino-2-(3-N-morpholino-1-propylamino)-benzenesulphonamide, N-morpholinyl-5-amino-2-(3N-morpholino-1-propylamino)-benzenesulphonamide, N,N-diethyl-5-amino-2-(3-N-morpholino-1-propylamino)-benzenesulphonamide, N-methyl-5-amino-2-(3-N-morpholino--propylamino)-benzenesulphonamide, N-(N'-methylpiperazinyl)-5-amino-2-(3-N-morpholino-1-propylamino)-benzenesulphonamide, N-(3-N'-morpholino-1-propyl)-5-amino-2-(3-N-morpholino-1-propylamino)-benzenesulphonamide, N-morpholinyl-5-amino-2-(2-N-piperazino-1-ethylamino)-benzenesulphonamide, N-morpholinyl-5-amino-2-N-(N'-2-aminoethyl)-piperazinobenzenesulphonamide, N,N-dimethyl-5-amino-2-(2-N-piperazino-1-ethylamino)-benzenesulphonamide, 5-amino-2-N-(N'-2-aminoethyl)-piperazinobenzenesulphonamide, N-morpholinyl-5-amino-2-(3-dimethylamino-1-propylamino)-benzenesulphonamide, N,N-diethyl-5-amino-2-[3-N-methyl-N-(3-aminopropyl)-1-propylamino]-benzenesulphonamide, N-[3-N'-methyl-N'-(3-aminopropyl)-1-propyl]-5-amino-2-methylaminobenzenesulphonamide, N-3-ethoxy-1-propyl-5-amino-2-(3-diethylamino-1-propylamino)-benzenesulphonamide, N-β-sulphoethyl-5-amino-2-(3-dimethylamino-1-propylamino)-benzenesulphonamide, 5-amino-2-(2-diethylamino-1-ethylamino)-benzenesulphonamide, 5-amino-2-[3-bis-β-hydroxyethylamino)-1-propylamino]-benzenesulphonamide and N-methyl-5-amino-2-[3-diethylamino-1-propylamino)-benzenesulphonamide.

The new basic dyestuffs, in protonated or quaternised form, are readily water-soluble and can be used for dyeing a wide range of different materials such as cellulose materials, polyacrylonitrile, acid-modified nylon and polyesters, wool and leather, from aqueous solutions.

The dyestuffs according to the invention are highly suitable in particular for dyeing a very wide range of different types of paper in bright blue shades.

Dyeing proceeds to high degrees of exhaustion, as evidenced by concentration of the dyestuff in the waste water. The dyeings have good wet and light fastness properties. They are very resistant to the action of water, alcohols, soaps and aqueous organic acids.

The numbers given in the examples to characterise the colour are Colour Index hue indicator numbers.

EXAMPLE 1

A. 67.0 g of 1-(2'-diethylaminosulphonyl-4'-nitrophenyl)-amino-3-dimethylaminopropane hydrochloride are catalyticlly reduced at 25°–45° C. under 20–80 atmospheres of hydrogen in 400 ml of water and 80 ml of methanol in an autoclave in the presence of 10 g of Raney nickel. The nickel is filtered off and washed with 50 ml of hot water, and the combined filtrates are brought to pH 6.5 with hydrochloric acid and to a temperature of 50° C.

20.0 g of ground 2,3,5,6-tetrachloroquinone are suspended in 75 ml of methanol, and the suspension is added to the above solution. The reaction mixture is held at pH 6.0–6.5 by the dropwise addition of 2N sodium carbonate solution. The reaction is largely complete after about 2 hours, and the consumption of sodium carbonate gradually dies down. The brown precipitate of the reaction product of the formula and be used in that form for coloristic purposes, for example for dyeing polyacrylonitrile.

To prepare the free base, the dyestuff salt is suspended in 500 ml of water, the suspension is brought to pH 12.6 with sodium hydroxide solution, and the suspended matter is filtered off with suction, and is washed first with 10% strength sodium chloride solution and then with water until virtually chloride-free. Drying leaves about 26 parts of the free base which gives a bright reddish blue solution in dilute acetic acid.

C. 10.0 g of the dyestuff base obtained are dissolved at 60° C. in 60 ml of nitrobenzene; 3.8 g of dimethyl sulphate are added dropwise in the course of 15 minutes,

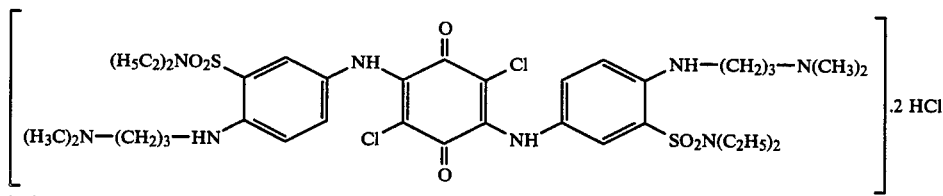

is filtered off with suction, is washed with 1 liter of 10% strength sodium chloride solution and is dried at 60° C. in a circulating air cabinet.

and the mixture is stirred for an additional 30 minutes.

The suspension of the resulting quaternary salt of the formula

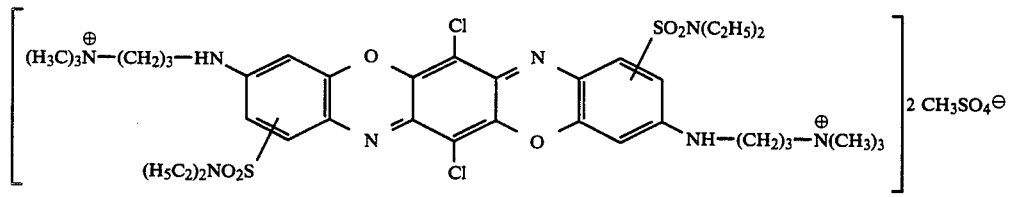

The starting nitro compound is obtained by condensing 2-chloro-5-nitrobenzenesulphonyl chloride at 20° C. with 20% strength aqueous diethylamine and then replacing the chlorine atom in the 2-position at 70° C. in 1-amino-3-dimethylaminopropane.

B. 33.0 g of the condensation product of Example 1A are gradually added at 20° C. to 180 ml of 20% strength oleum in the course of about 2 hours. The mixture is stirred for an additional 30–60 minutes until the solid is completely dissolved, and 19.8 g of potassium peroxodisulphate ($K_2S_2O_8$) are then added continuously in the course of 30 minutes. The temperature is held at 25°–28° C. by slight cooling. The colour of the solution changes from brown to blue. Stirring is continued at this temperature for an additional 1–2 hours, until a chromatographic sample indicates the complete disappearance of a starting material and no further change.

The batch is poured onto 1,300 g of ice, the mixture is diluted with 2.4 liters of 25% strength sodium chloride solution, the precipitate is filtered off with suction, and adhering sulphuric acid is removed by washing with 25% strength sodium chloride solution. The blue dyestuff obtained can be dried in the form of the salt of the base $\lambda_{max}=611$ nm in 5% strength acetic acid is cooled down to 20° C., the precipitate is filtered off with suction, and the filter cake is washed with chlorobenzene and toluene and dried. The result is 11.7 g of dyestuff in quaternised form.

D. A variant of the conversion of the dyestuff base obtained in Section B into the quaternary salt comprises the following procedure:

10.0 g of the dyestuff base are dissolved/suspended in 50 ml of N-methylpyrrolidone. Dropwise addition at 60° of 3.0 g of dimethyl sulphate leads to quaternary salt formation, any suspended matter going into solution. 500 ml of 20% strength sodium chloride solution are added dropwise, the mixture is stirred for some hours to ensure complete precipitation, the precipitate is filtered off with suction, and the filter cake is washed with 10% strength sodium chloride solution and finally with 2% strength sodium chloride solution. The quaternary salt obtained is dried at 60° C. in a circulating air cabinet.

Bright blue (C.I. hue indicator number 14) dyeings on paper are obtained by adding a solution of a quaternary salt in 5% strength acetic acid to a suspension of bleached pulp, stirring at 20° for 15 minutes, and using the coloured material to prepare sheets of paper on a

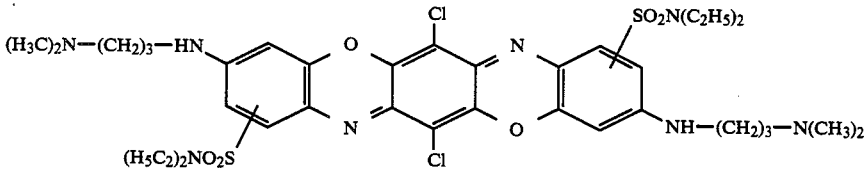

sheetformer, the degree of exhaustion obtained being high, or by spraying ready-made sheets with a solution of quaternary salt.

EXAMPLE 2

If Example 1 is repeated using 59.9 g of 1-(2'-methylaminosulphonyl-4'-nitrophenyl)-amino-3-dimethylaminopropane hydrochloride in place of the 1-(2'-diethylaminosulphonyl-4'-nitrophenyl)-amino-3-dimethylaminopropane hydrochloride, the nitro group is reduced, the resulting amino compound is condensed with tetrachloroquinone, the condensation product is cyclised in oleum to the corresponding triphendioxazine and the tertiary amino groups in the latter are quaternised in the manner described in Example 1, this gives a dyestuff of the formula

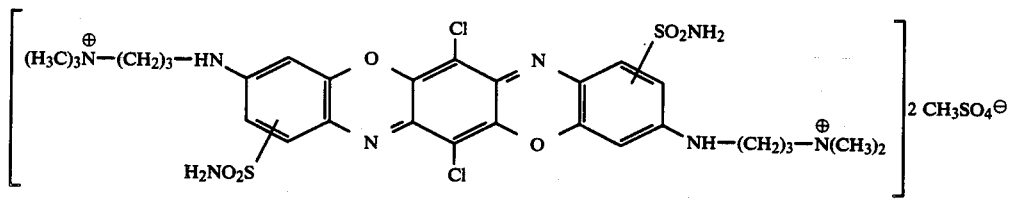

$\lambda_{max}$=615 nm in 5% strength acetic acid which likewise dyes paper in bright blue shades having good wet fastness properties (C.I. hue indicator number 14).

EXAMPLE 3

If Example 1 is repeated using 65.0 g of 1-(2'-methylaminosulphonyl-4'-nitrophenyl)-amino-3-diethylaminopropane hydrochloride in place of the 1-(2'-diethylaminosulphonyl-4'-nitrophenyl)-amino-3-dimethylaminopropane hydrochloride, this gives a dyestuff of the formula

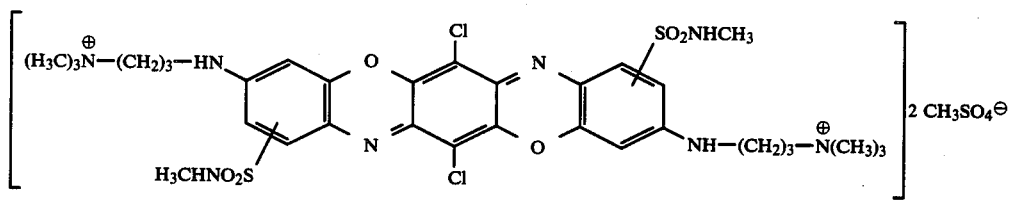

$\lambda_{max}$=615 nm in 5% strength acetic acid which is likewise highly suitable for dyeing paper and polyacrylonitrile in bright blue shades (C.I. hue indicator number 14).

EXAMPLE 4

If Example 1 is repeated except that 57.5 g of 1-(2'-aminosulphonyl-4'-nitrophenyl)-amino-3-dimethylaminopropane hydrochloride are used in place of the 1-(2'-diethylaminosulphonyl-4'-nitrophenyl)-amino-3-dimethylaminopropane hydrochloride, this gives a dyestuff of the formula

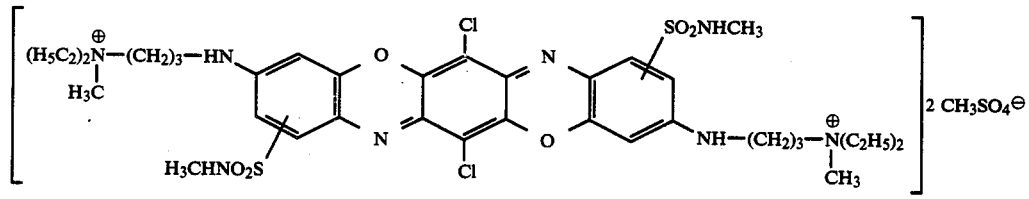

$\lambda_{max}$=616 nm in 5% strength acetic acid which dyes paper and polyacrylonitrile in bright blue shades (C.I. hue indicator number 14).

EXAMPLE 5

A. 54.3 g of N-(dimethylamino-1-propyl)-2-ethylamino-5-nitrobenzenesulphonamide hydrochloride are catalytically reduced at 30°–50° C. in 400 ml of water and 70 ml of methanol in an autoclave using 10 g of Raney nickel. The nickel is filtered off and washed with 50 ml of hot water, and the combined filtrates are raised to a temperature of 50° C. and brought to pH 6.5. 16.9 g of ground 2,3,5,6-tetrachloroquinone are suspended in 50 ml of ethanol. The suspension is added at 50° to the above solution in one go, and the reaction mixture is held at pH 6.0–6.5 by the dropwise addition of 2N sodium carbonate solution. After the reaction has ended, which is evident from the fact that the consumption of sodium carbonate ceases, the reaction mixture is allowed to cool down with stirring after about 2 to 3 hours. The condensation product of the formula

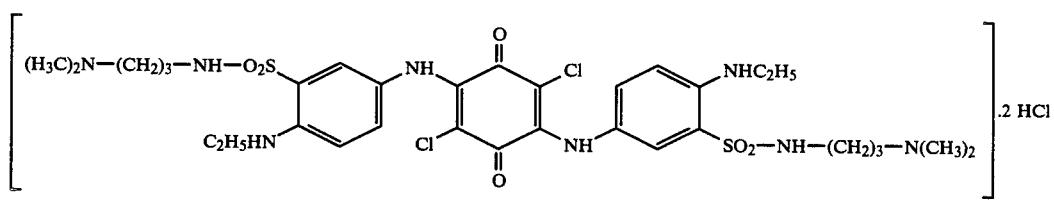

which has precipitated in the form of brown needles is filtered off with suction, is washed with 750 ml of 10% strength sodium chloride solution and 300 ml of 5% strength sodium chloride solution and is dried at 60° in a circulating air cabinet.

The nitro compound used at the start of the reaction is obtained by condensing 2-chloro-5-nitrobenzenesulphonyl chloride at 20° with 20–25% strength aqueous 1-amino-3-dimethylaminopropane and subsequently replacing the chlorine atom in the 2-position at 80° C. by the ethylamine radical in a 10–15% strength aqueous solution of the amine.

B. 28.6 g of the tetrachloroquinone condensation tion and then with water, and is dried. The dyestuff base gives a bright reddish blue solution in dilute acetic acid.

C. 10.0 g of the dyestuff base of Example 5B are suspended in 60 ml of N-methylpyrrolidone. 3.9 g of dimethyl sulphate are added dropwise at 55° C. in the course of 15 minutes and the suspension is maintained at 55° C. for a further 30–60 minutes. The suspension of the precipitated quaternary salt is then cooled down to 5°, and the salt is filtered off with suction and washed with chlorobenzene until the liquid running off starts to turn pale, and then with petroleum ether. Drying at 60° C. in a circulating air cabinet leaves about 12 parts of the quaternary salt of the formula:

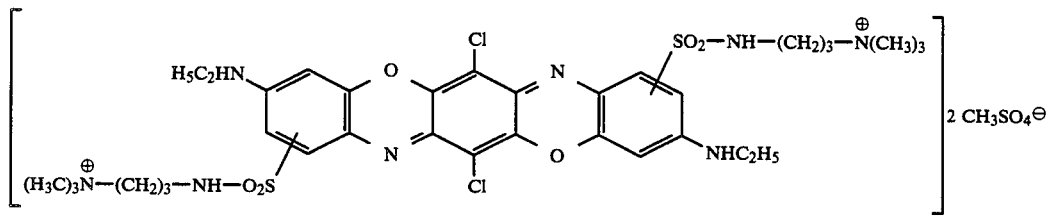

product of Example 5A are gradually added at 20° to 150 ml of 20% strength oleum. The solid is completely dissolved after 30–60 minutes of stirring. 18.3 g of potassium peroxodisulphate are then continuously added at 25° C. in the course of 30 minutes, the temperature being maintained between 25° and 28° C. by occasional cooling. The colour of the solution gradually changes from brown to blue. After the reaction has ended 1–2 hours later, the solution is poured onto 1,100 g of ice, 2.5 liters of 25% strength sodium chloride solution are added, and the suspension is stirred for some further hours. The dyestuff is filtered off with suction and is washed with saturated sodium chloride solution until free of sulphuric acid. The blue dyestuff obtained is the salt of the dyestuff base $\lambda_{max}$=584 nm, ~620 nm in 5% strength acetic acid.

The dyestuff in this form is suitable not only for dyeing paper but also for dyeing polyacrylonitrile and cellulose fabrics (C.I. hue indicator number 14).

D. A variant of the synthesis of the quaternary salt comprises the following procedure:

10.0 g of the dyestuff base of Section B in the form of the salt obtained there are suspended/dissolved in 150 ml of water. 0.3 ml of an emulsifier based on lauryl alcohol and ethylene oxide is added and the suspension solution is brought to pH 8.5. 4.5 g of dimethyl sulphate are then added dropwise at 25° C. and pH 8.5–9.0 is maintained with 1N sodium hydroxide solution. After 2 hours the temperature is raised to 60°–70° C. and the above pH is maintained further. When the solution has

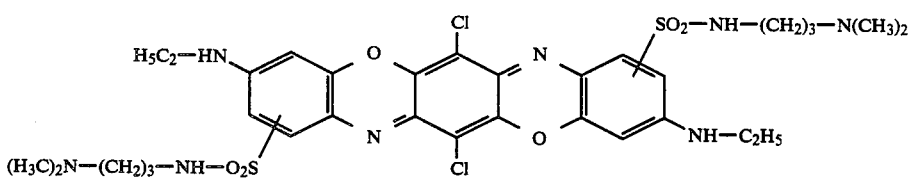

It can be dried in this form and be used for coloristic purposes such as the dyeing of paper, polyacrylonitrile or cellulose fibres.

To prepare the free base, the dyestuff salt is suspended in 500 ml of water, the suspension is brought to pH 12.5 with sodium hydroxide solution, 60 g of sodium chloride are added, the suspension is stirred, the precipitate is filtered off with suction, and the filter cake is washed first with 10% strength sodium chloride solucooled down the dyestuff is isolated by salting out or the solution is directly evaporated under vacuum in a rotary evaporator.

EXAMPLE 6

Example 5 is repeated, except that 56.4 g of N-(3-diethylamino-1-propyl)-2-methylamino-5-nitrobenzenesulphonamide hydrochloride are used in place of the N-(3-dimethylamino-1-propyl)-2-ethylamino-5-nitrobenzenesulphonamide hydrochloride, affording a dyestuff of the formula

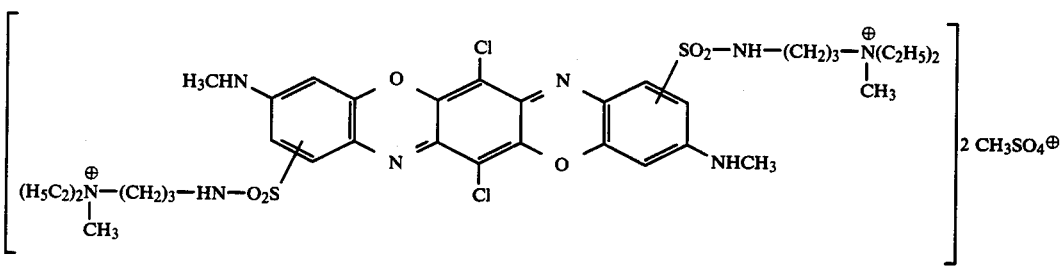

$\lambda_{max}$=582 nm, ~619 nm in 5% strength acetic acid which is suitable for the same purposes as the dyestuff of Example 5 (C.I. hue indicator number 14).

EXAMPLE 7

A 45.0 g of N-(3-dimethylamino-1-propyl)-2-amino-5-nitrobenzenesulphonamide hydrochloride are hydrogenated at 30°-50° C. in 350 ml of water and 70 ml of ethanol in an autoclave using 10 g of Raney nickel. After the reaction has ended the nickel is filtered off, and the resulting solution is raised to a temperature of 50° C. and brought to pH 6.5.

19.0 g of 2,3,5,6-tetrachlorobenzoquinone are suspended in 60 ml of ethanol. The suspension is added at 50° C. to the filtrate obtained above and the reaction mixture is held at pH 6.0–6.5 by the dropwise addition of 2N sodium carbonate solution. When the consumption of sodium carbonate has died down, the reaction mixture is gradually cooled down with stirring to room temperature. The product of the formula

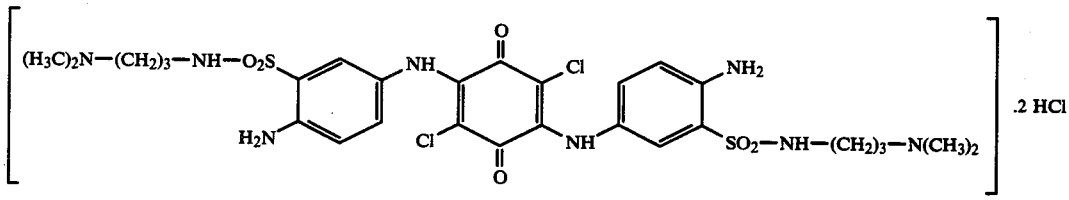

is cooled down, is washed with 750 ml of 10% strength sodium chloride solution and 250 ml of 5% strength sodium chloride solution and dried at 60° C. in a circu-lating air cabinet.

The nitro compound used is obtained by condensing 2-chloro-5-nitrobenzenesulphonyl chloride at 20° C. with aqueous 1-amino-3-dimethylaminopropane and subsequently replacing the chlorine atom in the 2-position at 80° C. in concentrated ammonia.

B. 30.0 g of the above quinone are added at 15°-20° C. to 125 ml of 20% strength oleum. The solution obtained then has added to it 20.8 g of potassium peroxodisulphate in the course of 30 minutes at a rate such that the temperature in the reaction mixture does not exceed 25° C. Stirring is continued at this temperature for 30 minutes to 1 hour, and the mixture is then poured onto 1,000 g of ice. 275 ml of 50% strength sodium hydroxide solution are then added dropwise with cooling until the suspension is at pH 12.5. The suspension of the dyestuff base is stirred for some hours more and is filtered with suction, and the filter cake is washed with 1 liter of 25% strength sodium chloride solution. The filter cake is suspended in 2 liters of 25% strength sodium chloride solution, the suspension is filtered once more with suction, and the filter cake obtained once again is washed with 1 liter of 25% strength sodium chloride solution and 500 ml of 10% strength sodium chloride solution until sulphate-free. The dyestuff base obtained is dried at 60° C. in a circulating air cabinet.

C. 10.0 g of the dyestuff base obtained are suspended in 60 ml of nitrobenzene; the suspension is heated to 60° C., and 4.0 ml of dimethyl sulphate are added dropwise to it in the course of 10 minutes. It is stirred at this temperature for 1½ hours and cooled down to 20° C., and the precipitated quaternary dyestuff salt is filtered off with suction. The filter cake is washed with chloro-benzene and at the end with petroleum ether and is dried at 60° C. in a circulating air cabinet. The dyestuff salt obtained has the formula

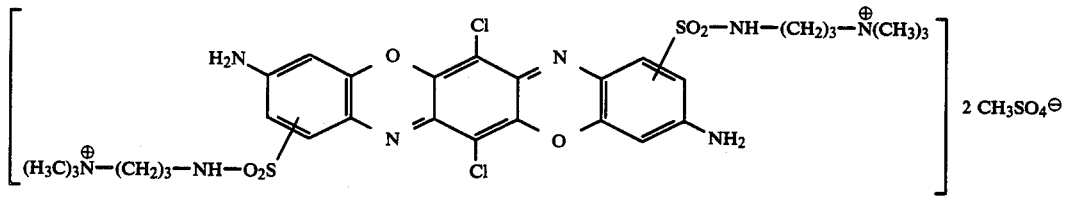

$\lambda_{max}$=595 nm in 5% strength acetic acid.

Alternatively, it is also possible to quaternise 10.0 g of the dyestuff base obtained at 60° C. in 50 ml of N-methylpyrrolidone with 4.0 ml of dimethyl sulphate and to isolate the dissolved dyestuff salt by precipitating it and washing it with isopropanol or to suspend the salt of the dyestuff base obtained in Example 7B in water analogously to the procedure of Example 5D and to quaternise it at pH 8.5–9.0 with dimethyl sulphate.

The dyestuff salt obtained is suitable for dyeing paper in bright reddish blue shades (C.I. hue indicator number 13).

Similar blue dyestuffs of the general formula I which are suitable for dyeing paper, polyacrylonitrile and cellulose fibres are obtained by condensing the substituted 1,4-benzoquinones listed in column 2 of Table 1 with the 5-amino-2-(alkyl)aminobenzenesulphonamides of column 3 in the manner of Examples 1-7, converting the condensation products oxidatively in oleum into the dioxazine dyestuff bases, and converting the latter by quaternisation with dimethyl sulphate, diethyl sulphate, methyl toluenesulphonate, methyl chloride, methyl bromide or benzyl chloride into the quaternary ammonium salts.

TABLE 1

| Example No. | Substituted benzoquinone | 5-Amino-2-(alkyl)aminobenzene-sulphonamide component | C.I. indicator number |
|---|---|---|---|
| 8 | 2,3,5,6-Tetrachloroquinone | 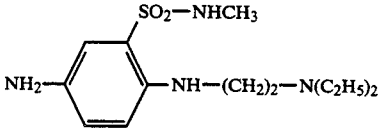 | 14 |
| 9 | 2,3,5,6-Tetrachloroquinone | 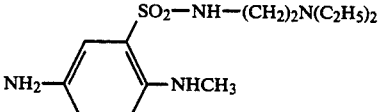 | 14 |
| 10 | 2,3,5,6-Tetrachloroquinone | 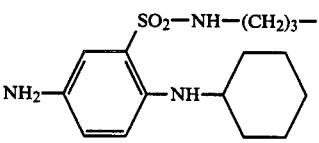 | 14 |
| 11 | 2,3,5,6-Tetrachloroquinone | 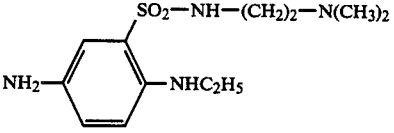 | 14 |
| 12 | 2,3,5,6-Tetrabromo-1,4-benzoquinone | 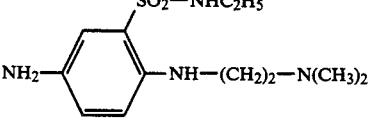 | 14 |
| 13 | 2,3,5,6-Tetrabromo-1,4-benzoquinone | 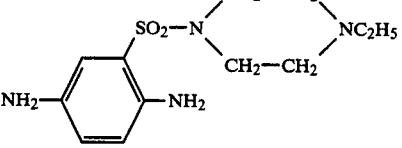 | 13 |
| 14 | 2,3,5,6-Tetrabromo-1,4-benzoquinone | 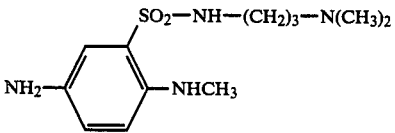 | 14 |
| 15 | 2,5-Dichloro-3,6-di-acetyl-amino-1,4-benzoquinone | 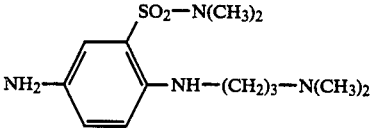 | 14 |
| 16 | 2,5-Dichloro-3,6-di-benzoyl-amino-1,4-benzoquinone | 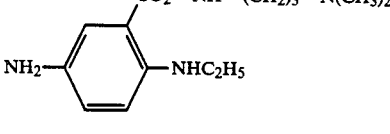 | 14 |

TABLE 1-continued

| Example No. | Substituted benzoquinone | 5-Amino-2-(alkyl)aminobenzene-sulphonamide component | C.I. indicator number |
|---|---|---|---|
| 17 | 2,3,5,6-Tetrachloro-1,4-benzoquinone | 2-NHCH$_3$, 5-NH$_2$ benzene with SO$_2$-N(CH$_2$CH$_2$)$_2$N-CH$_3$ (piperazine) | 14 |
| 18 | 2,3,5,6-Tetrachloro-1,4-benzoquinone | 2-NH$_2$, 5-NH$_2$ benzene with SO$_2$-NH-(CH$_2$)$_3$-N(CH$_3$)$_2$ | 13 |
| 19 | 2,3,5,6-Tetrachloro-1,4-benzoquinone | 2-NH-(CH$_2$)$_3$-N(CH$_3$)$_2$, 5-NH$_2$ benzene with SO$_2$-NH-cyclohexyl | 14 |
| 20 | 2,3,5,6-Tetrachloro-1,4-benzoquinone | 2-NHCH$_3$, 5-NH$_2$ benzene with SO$_2$-N(CH$_2$CH$_2$)$_2$N-CH$_2$CH$_2$OH (piperazine) | 14 |
| 21 | 2,3,5,6-Tetrachloro-1,4-benzoquinone | 2-NH-CH$_2$-CH$_2$-N(CH$_2$CH$_2$)$_2$NH (piperazine), 5-NH$_2$ benzene with SO$_2$-NHCH$_3$ | 14 |
| 22 | 2,3,5,6-Tetrachloro-1,4-benzoquinone | 2-NH-(CH$_2$)$_3$-N(CH$_3$)C$_2$H$_5$, 5-NH$_2$ benzene with SO$_2$-NHCH$_3$ | 14 |
| 23 | 2,3,5,6-Tetrachloro-1,4-benzoquinone | 2-NH-CH(CH$_3$)$_2$, 5-NH$_2$ benzene with SO$_2$-NH-(CH$_2$)$_3$-N(C$_2$H$_5$)$_2$ | 14 |
| 24 | 2,3,5,6-Tetramethoxy-1,4-benzoquinone | 2-NH-(CH$_2$)$_3$-N(CH$_3$)$_2$, 5-NH$_2$ benzene with SO$_2$-N(CH$_3$)$_2$ | 14 |
| 25 | 2,3,5,6-Tetraphenoxy-1,4-benzoquinone | 2-NH-(CH$_2$)$_3$-N(CH$_3$)$_2$, 5-NH$_2$ benzene with SO$_2$-N-(C$_2$H$_5$)$_2$ | 14 |

TABLE 1-continued

| Example No. | Substituted benzoquinone | 5-Amino-2-(alkyl)aminobenzene-sulphonamide component | C.I. indicator number |
|---|---|---|---|
| 26 | 2-Methyl-3,5,6-trichloro-1,4-benzoquinone | 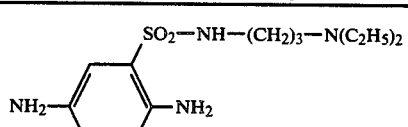 $NH_2$—◯—$NH_2$ with $SO_2$—$NH$—$(CH_2)_3$—$N(C_2H_5)_2$ | 13 |
| 27 | N—Phenyl-2,5-dichloro-1,4-benzoquinone-3,6-dicarboxamide | 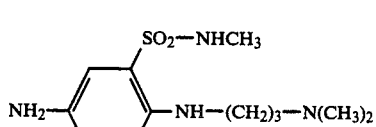 $NH_2$—◯—$NH$—$(CH_2)_3$—$N(CH_3)_2$ with $SO_2$—$NHCH_3$ | 14 |
| 28 | Ethyl 2,5-dibromo-1,4-benzoquinone-3,6-dicarboxylate | 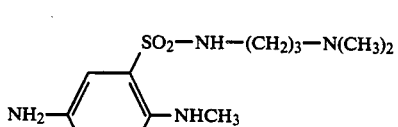 $NH_2$—◯—$NHCH_3$ with $SO_2$—$NH$—$(CH_2)_3$—$N(CH_3)_2$ | 14 |
| 29 | 2,5-Dibromo-1,4-benzoquinone-3,6-dicarboxamide | 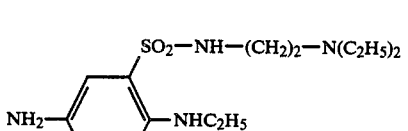 $NH_2$—◯—$NHC_2H_5$ with $SO_2$—$NH$—$(CH_2)_2$—$N(C_2H_5)_2$ | 14 |
| 30 | Dibromo-3,6-dibenzoyl-amino-1,4-benzoquinone | 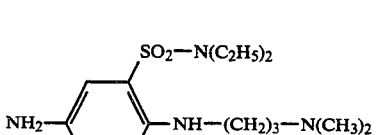 $NH_2$—◯—$NH$—$(CH_2)_3$—$N(CH_3)_2$ with $SO_2$—$N(C_2H_5)_2$ | 14 |
| 31 | 2,5-Dichloro-3,6-diacetyl-amino-1,4-benzoquinone | 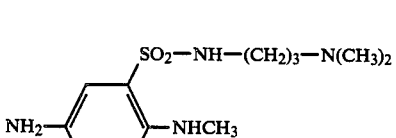 $NH_2$—◯—$NHCH_3$ with $SO_2$—$NH$—$(CH_2)_3$—$N(CH_3)_2$ | 14 |
| 32 | 2,3,5,6-Tetrachloroquinone | 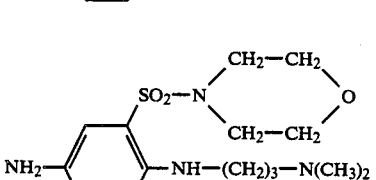 $NH_2$—◯—$NH$—$(CH_2)_3$—$N(CH_3)_2$ with $SO_2$—morpholinyl | 14 |
| 33 | 2,3,5,6-Tetrachloroquinone | 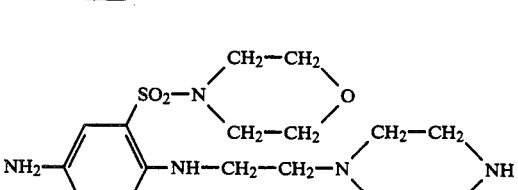 $NH_2$—◯—$NH$—$CH_2$—$CH_2$—N(piperazinyl-NH) with $SO_2$—morpholinyl | 14 |
| 34 | 2,3,5,6-Tetrachloroquinone | 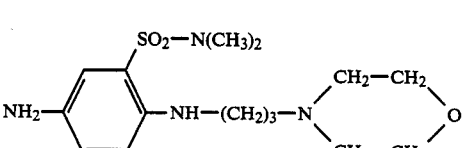 $NH_2$—◯—$NH$—$(CH_2)_3$—N(morpholinyl) with $SO_2$—$N(CH_3)_2$ | 14 |

TABLE 1-continued

| Example No. | Substituted benzoquinone | 5-Amino-2-(alkyl)aminobenzene-sulphonamide component | C.I. indicator number |
|---|---|---|---|
| 35 | 2,3,5,6-Tetrachloroquinone | ![structure] NH$_2$—[benzene ring]—SO$_2$—NH—(CH$_2$)$_3$N(morpholino), NH—C$_2$H$_5$ | 14 |
| 36 | 2,3,5,6-Tetrachloroquinone | NH$_2$—[benzene ring]—SO$_2$—N(CH$_3$)$_2$, NH—CH$_2$—CH$_2$—N(piperazino)NH | 14 |
| 37 | 2,3,5,6-Tetrachloroquinone | NH$_2$—[benzene ring]—SO$_2$—NH$_2$, NH—CH$_2$—CH$_2$—N(piperazino)NH | 14 |
| 38 | 2,3,5,6-Tetrachloroquinone | NH$_2$—[benzene ring]—SO$_2$—N(morpholino), NH—(CH$_2$)$_3$—N(morpholino) | 14 |
| 39 | 2,3,5,6-Tetrachloroquinone | NH$_2$—[benzene ring]—SO$_2$—NH$_2$, NH—(CH$_2$)$_3$—N(morpholino) | 14 |

EXAMPLE 40

A. 33.7 g of N-(3-dimethylamino-1-propyl)-2-ethylamino-5-aminobenzenesulphonamide hydrochloride are dissolved at 40° C. in 300 ml of water. The solution is brought to pH 6, and a hot solution of 10.8 g of 1,4-benzoquinone in 250 ml of ethanol is added. pH 6 is maintained further with a little 1N sodium carbonate solution, the temperature is maintained at 40°-45° C., and stirring is continued under these conditions for 12 hours. After the reaction has ended, the brown solution is cooled down to 20° C., 1,250 ml of 25% strength sodium chloride solution are added dropwise, stirring is continued for some time, and the brown precipitate is filtered off with suction. The filter cake is washed with 10% strength sodium chloride solution and is dried at 60° C. in a circulating air cabinet.

B. 20.0 g of the product of Example 40A are added at 20°-25° C. to 80 ml of 20% strength oleum.

When all of the product has dissolved, 13.4 g of potassium peroxodisulphate are added in the course of 30 minutes. The mixture is stirred at 25°-30° C. for a number of hours and is then poured onto 650 g of ice, 1.3 liters of 25% strength sodium chloride solution are added, the precipitate is filtered off with suction, and the cake is washed with 25% strength sodium chloride solution until sulphate-free. The blue dyestuff obtained can be dried in the form of the salt of the base

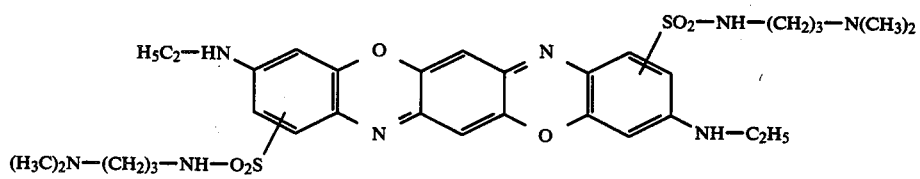

and be used in that form for coloristic purposes, for example for dyeing polyacrylonitrile (C.I. hue indicator number 14).

Analogously to Examples 1B-1D, the salt of the dyestuff base can be converted with dimethyl sulphate into the quaternary ammonium salt which is highly suitable for dyeing paper and polyacrylonitrile and cellulose fibres.

EXAMPLE 41

Example 40 is repeated, except that 13.6 g of 2,5-dimethyl-1,4-benzoquinone are used in place of the 1,4-benzoquinone, affording the salt of the dyestuff base desired quaternising these bases with dimethyl sulphate or methyl toluenesulphonate.

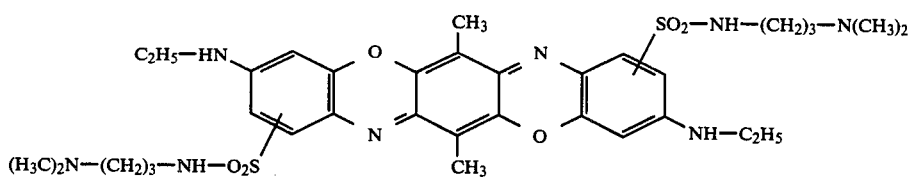

TABLE 2

| Example No. | 1,4-Benzoquinone components | 5-Amino-2-(alkyl)aminobenzene-sulphonamide components |
|---|---|---|
| 42 | 2,5-Dimethyl-1,4-benzoquinone | $NH_2-\phenyl(SO_2-N(CH_3)_2)-NH-(CH_2)_3-N(CH_3)_2$ |
| 43 | 2-Methyl-5-chloro-1,4-benzoquinone | $NH_2-\phenyl(SO_2-NHCH_3)-NH-(CH_2)_2-N(CH_3)C_2H_5$ |
| 44 | 2-Methyl-1,4-benzoquinone | $NH_2-\phenyl(SO_2-NH-(CH_2)_3-N(CH_3)_2)-NHCH_3$ |
| 45 | 2-Ethyl-1,4-benzoquinone | $NH_2-\phenyl(SO_2N(C_2H_5)_2)-NH-(CH_2)_2-CH(CH_3)-N(CH_3)_2$ |
| 46 | 2-Phenyl-1,4-benzoquinone | $NH_2-\phenyl(SO_2-NH-(CH_2)_2-N(C_2H_5)_2)-NH-C_2H_5$ |
| 47 | 2-Methoxy-5-methyl-1,4-benzoquinone | $NH_2-\phenyl(SO_2-N(CH_3)C_2H_5)-NH-(CH_2)_3-N(CH_3)_2$ |
| 48 | 1,4-Benzoquinone | $NH_2-\phenyl(SO_2-N(CH_3)_2)-NH-(CH_2)_3-N(CH_3)_2$ | which can likewise be converted into the quaternary salt with dimethyl sulphate as described in Examples 1B–1D.

Further blue dyestuffs of the general formula I which are suitable for dyeing paper and polyacrylonitrile and cellulose fibres (C.I. hue indicator number 14) are obtained by reacting the 1,4-benzoquinones listed in column 2 of Table 2 with the 5-amino-2-(alkyl)aminobenzenesulphonamides of column 3 in the manner of Example 40, converting the intermediate products obtained into the triphendioxazine dyestuff bases in oleum, and if

EXAMPLES 49–54

Similar dyestuffs are also obtained by condensing in Example 1 with 2,3,5,6-tetrachlorobenzoquinone not the 1-(2′-diethylaminosulphonyl-4′-aminophenyl)-amino-3-dimethylaminopropane hydrochloride but the hydrochlorides of the following aminobenzenesulphonamides of the formula (XIII):

| Example No. | Sulphonamide component |
|---|---|
| 49 | 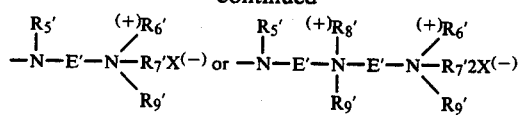 |
| 50 | (structure with morpholinyl $SO_2-N$ group, $NH_2$ and $NH-CH_2-CH_2-NH_2$) |
| 51 | (structure with $SO_2NH_2$, $NH_2$ and $NH-(CH_2)_3-NH_2$) |
| 52 | (structure with $SO_2NHCH_3$, $NH_2$ and $NH-(CH_2)_4-NH_2$) |
| 53 | 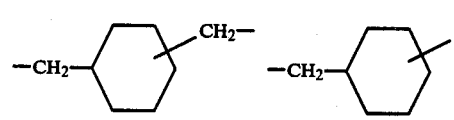 |
| 54 | (structure with $SO_2-N(CH_3)_2$, $NH_2$ and $NH-(CH_2)_3-NHCH_3$) | and then proceeding as in Example 1, except that the dyestuff bases are used for dyeing in the form of salts without quaternisation.

We claim:

1. Triphendioxazine dyestuffs of the formula

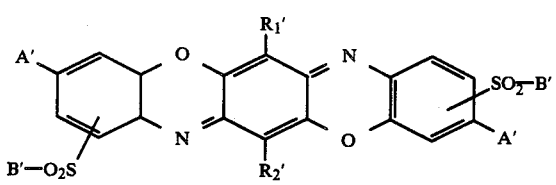

wherein $R_1'$ and $R_2'$ each denote hydrogen or halogen,

A' and B' each denote a radical of the formulae

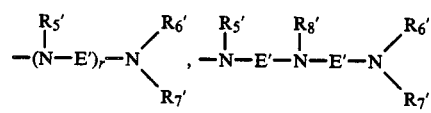

-continued

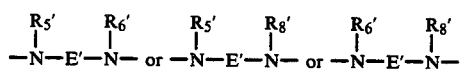

r denotes 0 or 1, $R_5'-R_9'$ each denote hydrogen or $C_1-C_4$-alkyl which is optionally substituted by hydroxyl, $C_1-C_4$-alkoxy, halogen, cyano, $C_1-C_4$-alkoxycarbonyl or $C_1-C_4$-alkylcarbonyl, $R_9'$ also denotes optionally $C_1-C_4$-alkyl-, hydroxyl-, $C_1-C_4$-alkoxy- or halogen-substituted benzyl or phenylethyl and E' denotes $C_2-C_6$-alkylene, cyclohexylene, phenylene or a radical of the formulae (cyclohexyl-based bridging structures)

wherein the six-membered rings can be substituted by $C_1-C_4$-alkyl, or $$-\underset{R_5'}{N}-E'-\underset{R_6'}{N}- \text{ or } -\underset{R_5'}{N}-E'-\underset{R_8'}{N}- \text{ or } -\underset{R_6'}{N}-E'-\underset{R_8'}{N}-$$

each represent an optionally $C_1-C_4$-alkyl-substituted piperazine or imidazolidine ring, or $R_7'-N-R_9'$ represents an optionally $C_1-C_4$-alkyl-substituted piperidine, morpholine, piperazine or pyrrolidine ring or

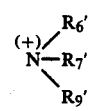

represents an optionally $C_1-C_4$-alkyl-substituted pyridinium radical and $X^{(-)}$ represents an anion, and at least one of the radicals A' and B' stands for one of said optionally protonated or quaternised polyamine radicals.

2. Triphendioxazine dyestuffs according to claim 1 of the formulae

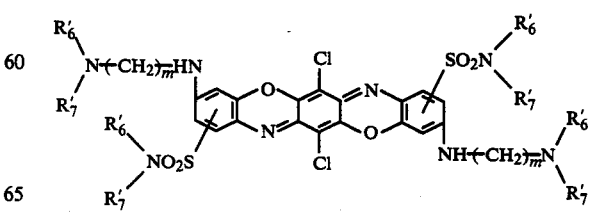

and

-continued

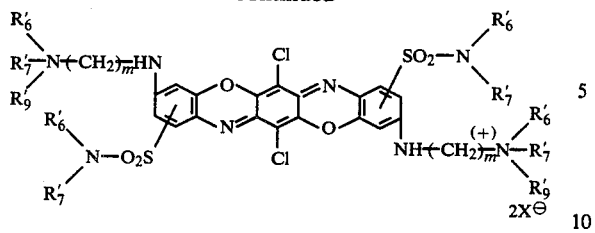

2X⁽⁻⁾ wherein
R₆', R₇', R₉' and X⁽⁻⁾ are as defined in claim 1 and m stands for 2–4.

3. Triphendioxazine dyestuffs according to claim 1 of the formulae

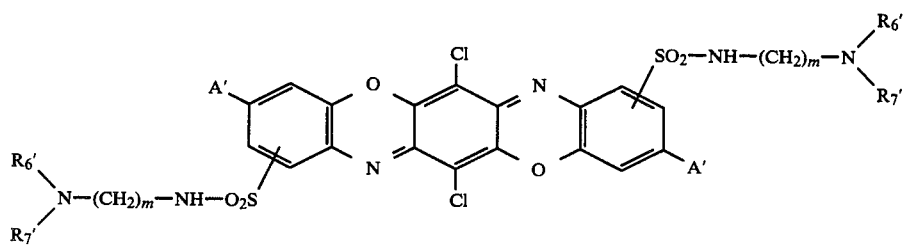

and

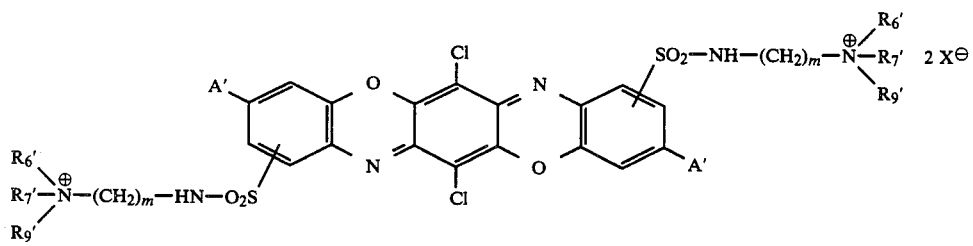

wherein
R₆', R₇', R₉' and X⊖ are as defined in claim 3, m stands for 2–4 and
A' stands for amino, C₁–C₄-alkylamino or cyclo-hexyl-amino.

4. Triphendioxazine dyestuffs according to claim 2, where
R₆' and R₇' each denote C₁–C₄-alkyl,
R₉' denotes hydrogen, C₁–C₄-alkyl or benzyl or

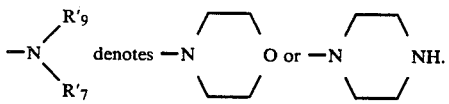

5. Triphendioxazine dyestuffs according to claim 3, where
R₆' and R₇' each denote C₁–C₄-alkyl,
R₉' denotes hydrogen, C₁–C₅-alkyl or benzyl or

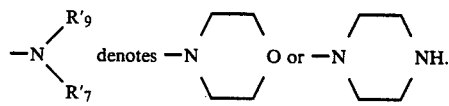

* * * * *